United States Patent
Zhu et al.

(10) Patent No.: US 10,026,443 B1
(45) Date of Patent: Jul. 17, 2018

(54) HEAT-ASSISTED MAGNETIC RECORDING ERROR-RECOVERY BY ERASING ADJACENT TRACKS USING LASER

(71) Applicant: Seagate Technology LLC, Cupertino, CA (US)

(72) Inventors: Wenzhong Zhu, Apple Valley, MN (US); Jason Charles Jury, Apple Valley, MN (US); Pu-Ling Lu, Rosemount, MN (US); Edward Charles Gage, Lakeville, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/601,056

(22) Filed: May 22, 2017

(51) Int. Cl.
| | |
|---|---|
| *G11B 11/00* | (2006.01) |
| *G11B 20/18* | (2006.01) |
| *G11B 5/024* | (2006.01) |
| *G11B 5/00* | (2006.01) |

(52) U.S. Cl.
CPC .......... *G11B 20/1889* (2013.01); *G11B 5/024* (2013.01); *G11B 2005/0021* (2013.01)

(58) Field of Classification Search
None
See application file for complete search history.

(56) References Cited

U.S. PATENT DOCUMENTS

| 5,475,666 A | * | 12/1995 | Ito | G11B 7/0045 |
| | | | | 369/116 |
| 5,559,780 A | * | 9/1996 | Maeda | G11B 7/126 |
| | | | | 369/53.13 |
| 5,949,747 A | * | 9/1999 | Miyashita | G11B 7/0055 |
| | | | | 369/53.26 |
| 7,738,208 B2 | | 6/2010 | Kim et al. | |
| 9,117,463 B1 | | 8/2015 | Tang et al. | |
| 2002/0064122 A1 | * | 5/2002 | Kato | G11B 7/00454 |
| | | | | 369/112.23 |
| 2007/0253096 A1 | * | 11/2007 | Alfred | G11B 5/5526 |
| | | | | 360/78.04 |
| 2009/0135693 A1 | | 5/2009 | Kim et al. | |
| 2011/0205861 A1 | * | 8/2011 | Erden | G11B 5/02 |
| | | | | 369/13.27 |

* cited by examiner

*Primary Examiner* — Peter Vincent Agustin
(74) *Attorney, Agent, or Firm* — Hollingsworth Davis, LLC (57) ABSTRACT

An error is determined in a target track of a heat-assisted recording medium. The error triggers an error recovery procedure. The error recovery procedure involves storing data from at least part of an adjacent track that is immediately proximate the target track to another data storage location. The error recovery procedure also involves, for two or more iterations in which a laser power is incrementally changed from a lower power to a higher power, erasing at least part of the adjacent track at the laser power and attempting to recover the target track.

19 Claims, 5 Drawing Sheets

HEAT-ASSISTED MAGNETIC RECORDING ERROR-RECOVERY BY ERASING ADJACENT TRACKS USING LASER

SUMMARY

The present disclosure is directed to heat-assisted magnetic recording error-recovery by erasing adjacent tracks using laser. In one embodiment, an error is determined in a target track of a heat-assisted recording medium. The error recovery procedure involves storing data from at least part of an adjacent track that is immediately proximate the target track to another data storage location. The error recovery procedure also involves, for two or more iterations in which a laser power is incrementally changed from a lower power to a higher power, erasing at least part of the adjacent track at the laser power and attempting to recover the target track.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to data storage devices that utilize magnetic storage media, e.g., disks. Data storage devices described herein may use a particular type of magnetic data storage known as heat-assisted magnetic recording (HAMR), also referred to as energy-assisted magnetic recording (EAMR), thermally-assisted magnetic recording (TAMR), and thermally-assisted recording (TAR). This technology uses an energy source such as a laser to create a small hotspot on a magnetic disk during recording. The heat lowers the magnetic coercivity at the hotspot, allowing a write transducer to change magnetic orientation, after which the hotspot is allowed to rapidly cool. Due to the relatively high coercivity of the medium after cooling, the data is less susceptible to data errors due to thermally-induced, random fluctuation of magnetic orientation known as the superparamagnetic effect.

A HAMR device uses a near-field transducer to concentrate optical energy into a hotspot in a recording layer. The hotspot raises the media temperature locally, reducing magnetic coercivity therefore reducing the writing magnetic field required for high-density recording. A waveguide integrated into a read/write head can be used to deliver light to the near-field transducer. Light from a light source, such as an edge-emitting laser diode, is coupled into the waveguide through waveguide input coupler or a spot size converter. The light source may be mounted to an outside surface of the read/write head.

Compared to conventional magnetic recording (e.g., perpendicular recording), HAMR drives may induce higher levels of adjacent track interference (ATI) due to higher read clearance and soft magnetic underlayer design of the recording medium. This ATI can degrade the signal-to-noise ratio (SNR) of the recorded data. In extreme cases, this loss of SNR may cause drive reliability problems which trigger a directed error-recovery program, e.g., a sector has insufficient SNR margin to enable reliable decoding causing the drive to initiate additional steps to recover the data. This disclosure describes techniques used to deal with the effects on a target track due to high levels of ATI in a HAMR drive. Generally, this involves erasing the adjacent track with a minimal or zero write current, then reading target track again. Erasing the adjacent track allows the target track data to be re-read with reduced adjacent track interference. Afterwards, the data from the adjacent track is rewritten in the original location or elsewhere so no data is lost.

Figure 1:
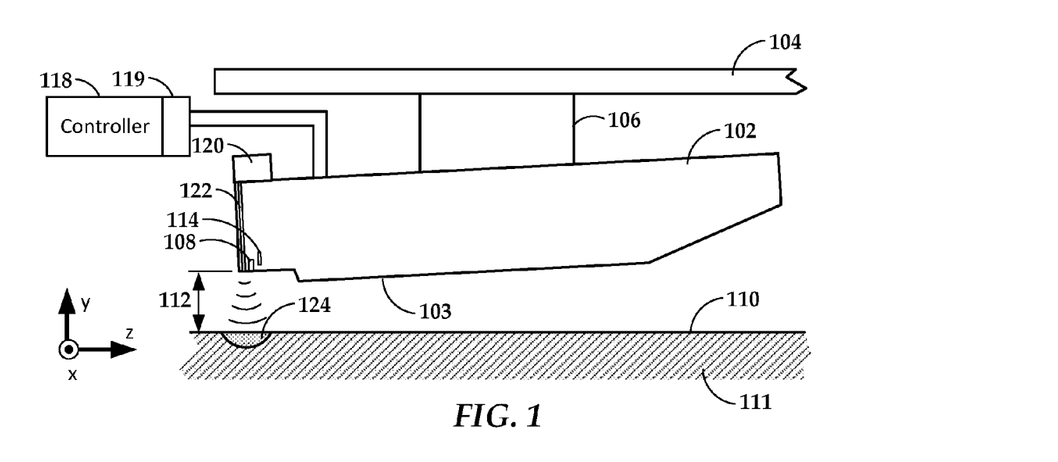
FIG. 1 is a view of a slider assembly according to an example embodiment.

In FIG. 1, a block diagram shows a side view of a HAMR read/write head 102 according to an example embodiment. The read/write head 102 may also be referred to herein as a slider, write head, read head, recording head, etc. The read/write head 102 is coupled to an arm 104 by way of a suspension 106, e.g., a gimbal. The read/write head 102 includes read/write transducers 108 at a trailing edge that are held proximate to a surface 110 of a magnetic recording medium 111, e.g., a magnetic disk. When the read/write head 102 is located over surface 110 of recording medium 111, a flying height 112 is maintained between the read/write head 102 and the surface 110 by a downward force of arm 104. This downward force is counterbalanced by an air cushion that exists between the surface 110 and an air bearing surface (ABS) 103 (also referred to herein as a "media-facing surface") of the read/write head 102 when the recording medium 111 is rotating.

In order to provide control of the clearance between the read/write transducers 108 and the recording medium 111, one or more clearance actuators 114 (e.g., heaters) are formed in the read/write head 102. A current applied to the heater 114 induces a local protrusion which varies the clearance. The amount of current applied to the heater 114 may vary based on which of the read/write transducers 108 are in use, and may also be adjusted to account for irregularities in the media surface 110, changes in ambient temperature, location of the read/write head 102 over the medium 111, etc.

A controller 118 is coupled to the read/write transducers 108, as well as other components of the read/write head 102, such as heaters 114, sensors, etc. The controller 118 may be part of general- or special-purpose logic circuitry that controls the functions of a storage device that includes at least the read/write head 102 and recording medium 111. The controller 118 may include or be coupled to a read/write channel 119 that include circuits such as preamplifiers, buffers, filters, digital-to-analog converters, analog-to-digital converters, decoders, encoders, etc., that facilitate electrically coupling the logic of the controller 118 to the signals used by the read/write head 102 and other components.

The illustrated read/write head 102 is configured as a HAMR device, and so includes additional components that form a hotspot 124 on the recording medium 111 near the read/write transducer 108. These components include a laser 120 (or other energy source) and a waveguide 122. The waveguide 122 delivers light from the laser 120 to components near the read/write transducers 108, such as a near-field transducer that emits a tightly focused stream of energy to form the hotspot 124. The read/write transducers 108 also include a magnetic coil and pole that applies a magnetic field to the hotspot 124 and the surrounding area. Because of the high coercivity of the recording medium 111, only the hotspot 124 is affected by the magnetic field due to the material being heated above the Curie temperature. Therefore, the size and shape of the hotspot 124 affects the location of magnetic transitions written to the recording medium 111, which can affect the size and location of the bits of data defined by the transitions.

Figure 2:
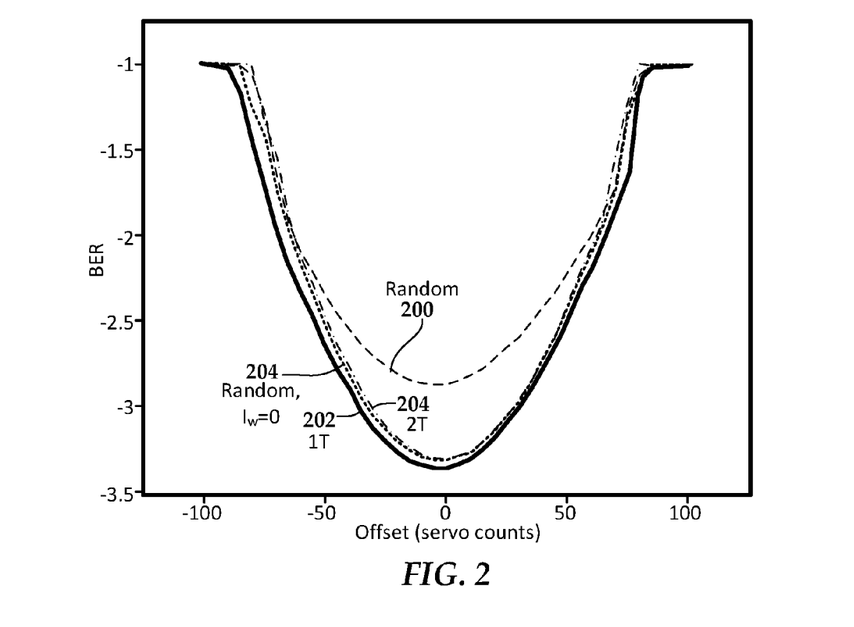
FIGS. 2 and 3 are graphs showing the effect of adjacent track erasure on bit error rate according to an example embodiment.

As noted above, the head-to-media clearance and structure of the recoding medium 111 can cause tracks to be to be written wider than desired, potentially encroaching on adjacent tracks. In order to reduce the effects of ATI on a track, a number of tests were performed on a HAMR drive, the results of which are shown in the graph of FIG. 2. To obtain the results, target tracks were written, and then adjacent tracks are written on either side of the target tracks with random data. A bit-error rate (BER, vertical axis of the graph) is measured at each of a plurality of cross track servo offsets (horizontal axis of the graph) to obtain the curves in the graph. Note that one track pitch (distance from target to adjacent track) is equivalent to 256 cross-track servo counts.

Curve 200 shows the BER for the track after the adjacent random data is written. The best BER for this curve 200 is about −2.85. Curves 202 and 204 are the measured BER for such a track after the adjacent tracks are overwritten with respective 1T and 2T patterns using the normal write current $I_W$ applied to the magnetic write coil. For curve 204, the adjacent tracks were overwritten with a minimum write current (e.g., $I_W$=0), however because the laser is still activated, the data in the adjacent tracks can still be erased due to heating of the track regions above the Curie temperature. For these latter cases, BER improves about 0.5 decade after we re-write the adjacent with 1T/2T pattern or random pattern with minimum write current. This improvement is due to adjacent track interference reduction.

Figure 3:
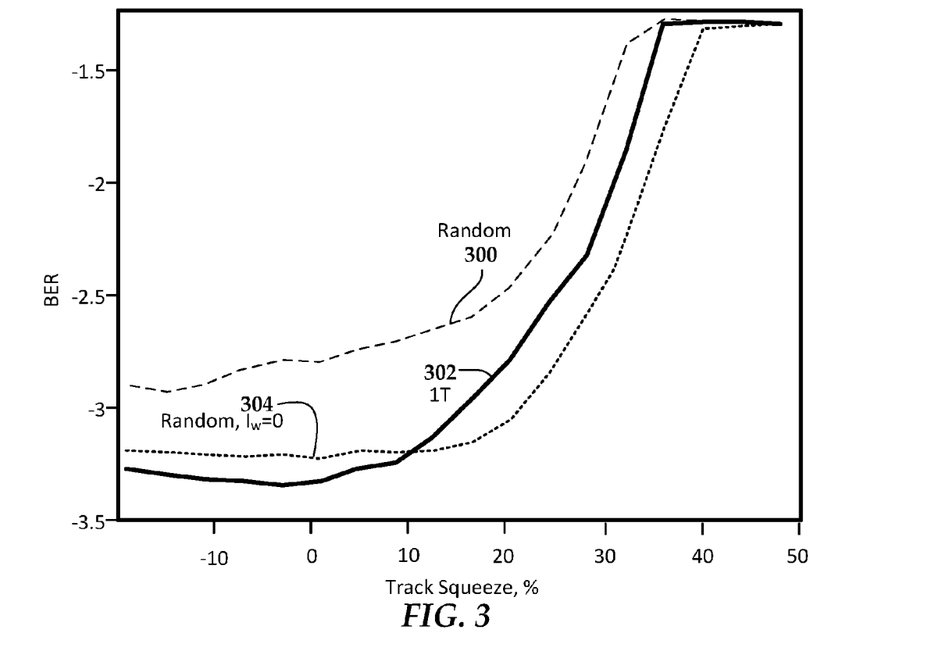

In FIG. 3, a graph shows BER with different squeezing patterns for random adjacent tracks (curve 300) and with adjacent track erasures using 1T (curve 302) and random with minimum write current (curve 304). The BER at 0% squeeze (triple track) is consistence with the result in FIG. 2, namely that squeezing track pattern with 1T is slightly better than random data with write current. However, as shown by curves 302 and 304, both types of erasure reduce adjacent track interference and improve BER compared to the adjacent random data at normal write current conditions shown in curve 300.

As seen in FIG. 3, when the track pitch is decreased (causing an increase in squeezing percentage), the BER improves for the random pattern at minimum write current compared to 1T pattern at normal write current. The effective write width (also referred to as write-plus-erasure, or WPE) is narrow with minimum/zero write current because the erasure in such a case is primarily due to heating of the medium well above the Curie temperature, which is concentrated over a small region at the center of the hotspot. When a normal write current is used together with the hotspot, e.g., for 1T erasure, the magnetic field extends beyond the center of hotspot (e.g., regions at or near the Curie temperature at the edge of the hotspot) and thereby enlarges the erasure region.

Usually, the sectors that trigger directed error-recovery have less SNR margin. For example, SNR margin is lower where one or more of the sectors of the target track are written off-center. Therefore, a smaller effective write width prevents further encroachment/erasure when erasing the adjacent track. In some embodiments, a directed error recovery involves a laser power being incrementally changed from a lower power to a higher power during a series of iterations. The adjacent track is erased at each laser power level, and recovery of the target track is attempted. This technique will start with a narrow write width to perform an erasure, the write width being slowly increased with each iteration.

Figure 4:
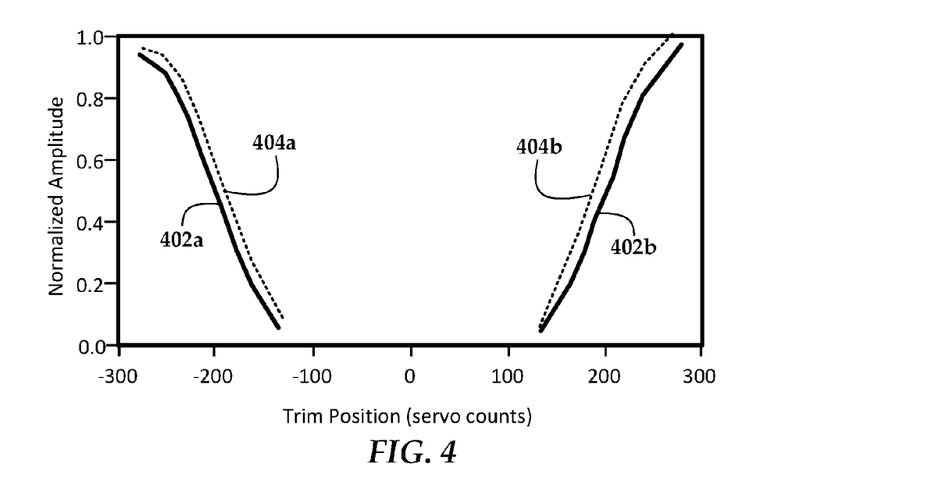
FIG. 4 is a graph showing write-plus-erase under various conditions according to an example embodiment.

In FIG. 4, a graph shows measured WPE with a target track being trimmed using a 4T pattern at normal write current (curves 402a and 402b) and with minimal (e.g., zero) write current (curves 404a and 404b). The WPE is about 4 nm narrower with min write current trimming compared to the normal write current trimming. Additional WPE results are shown in Table 1 below. The WPE values are expressed as servo counts, and show reduced WPE using write coil zero current for all values of trim erasure frequency.

TABLE 1

| Trim Frequency | Current $I_W$ | WPE Average | WPE Negative | WPE Positive |
|---|---|---|---|---|
| 4T | Full | 258.3 | −257.7 | 258.8 |
| 4T | Zero | 242.2 | −243.6 | 240.8 |
| 2T | Full | 260.1 | −258.4 | 261.9 |
| 2T | Zero | 243.4 | −243.4 | 243.5 |
| 1T | Full | 263.9 | −263.1 | 264.6 |
| 1T | Zero | 242.0 | −242.9 | 241.2 |

Figure 5:
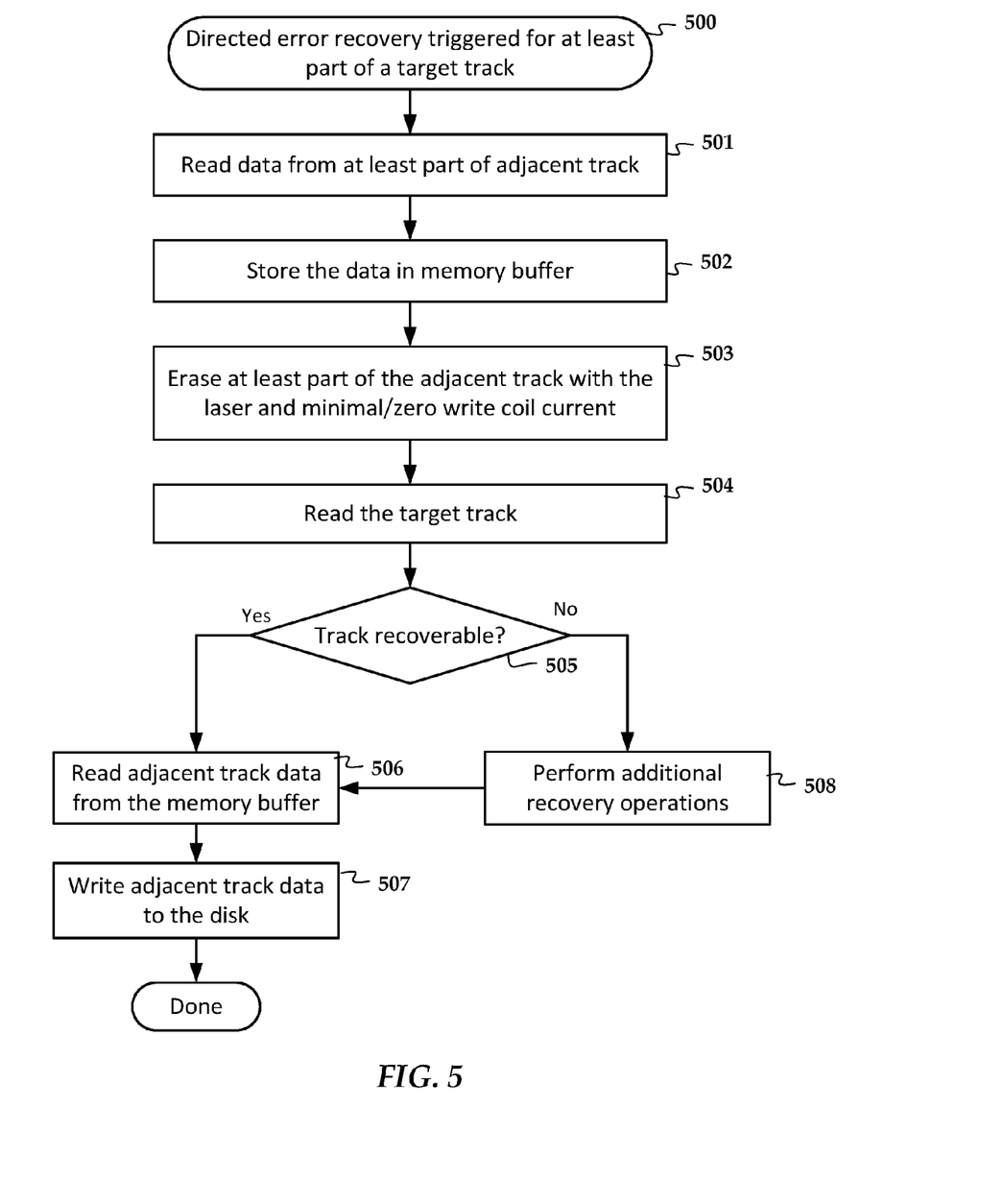
FIGS. 5 and 6 are flowcharts showing error recovery procedures according to example embodiments.

Based these results, a directed error procedure for a HAMR drive include operations as shown in FIG. 5. The procedure is triggered in response to directed error recovery 500, e.g., when one or more sectors of a target track cannot be read or decoded. At least part of an adjacent track is read 501 and the data from the part of the track is stored 502, e.g., in a volatile or non-volatile memory buffer. This reading 501 and storing 502 may be applied to one or both adjacent tracks on either side of the target track.

After data from the adjacent track is stored 502, at least part of the adjacent track is erased 503. This erasure 503 involves activating the laser over the part of the track with zero or minimal write current. For purposes of this procedure, a non-zero, minimal write current is a combination of write current settings (e.g., steady-state current, overshoot, rise time) that does not appreciably increase WPE compared to WPE with the laser used alone. In such a case, the minimal write current may use any pattern described above, e.g., 1T, 2T, 4T, etc. After the erasure 503, the target track is read 504 and it is determined 505 whether data in the track is recoverable.

If the target track data is recoverable as determined at block 505, then adjacent track data is read 506 from the memory buffer and the data is written 507 back to the disk. This writing 507 may involve rewriting the buffered data back to the same part of the adjacent track that was erased at 503, or may involve writing the buffered data to another location on the recording medium so as to not risk corrupting the target track. In the latter case, this other location may also be used as the buffer written to at block 502. In such a case, steps 506 and 507 would not be needed, as they would already have been performed at blocks 501-502.

If the writing 507 involves rewriting the adjacent track data to the original location that was just erased at 503, then the target track part may be re-read to ensure the rewriting of the adjacent track does not make the affected part of the target track unreadable. If the affected part of the target track is found subsequently unreadable, then the data of the affected part may be moved elsewhere on the disk to ensure long-term reliability.

If the target track data is not recoverable as determined at block 505, then additional error recovery operations 508 may be performed. For example, if only one adjacent track (or part thereof) was read 501, stored 502, and erased 503, then a same or similar sequence may be repeated on the other adjacent track (or part thereof). In other cases, the erasure 503 may be repeated with different laser and/or write coil current settings. For example, write coil power may be iteratively increased up to some maximum write coil power, and that power may be the same as or less than operational write coil power. This increase in write power may be performed at a fixed laser power, or the laser power may also be incremented for each iteration.

In some scenarios, the additional operations 508 may determine that target track data is not recoverable, which will be logged and communicated to the host. Whether or not the addition operations 508 are successful, the adjacent track data will be subsequently restored as indicated by blocks 506 and 507 (unless already performed at 501 and 502) so that the adjacent track data is retained. In scenarios where the target track data is recovered (block 505 returns 'yes'), the affected portion of the target track may remain as is, the affected portion of the target track may be refreshed, or the data from the affected portion may be moved elsewhere on the disk.

Figure 6:
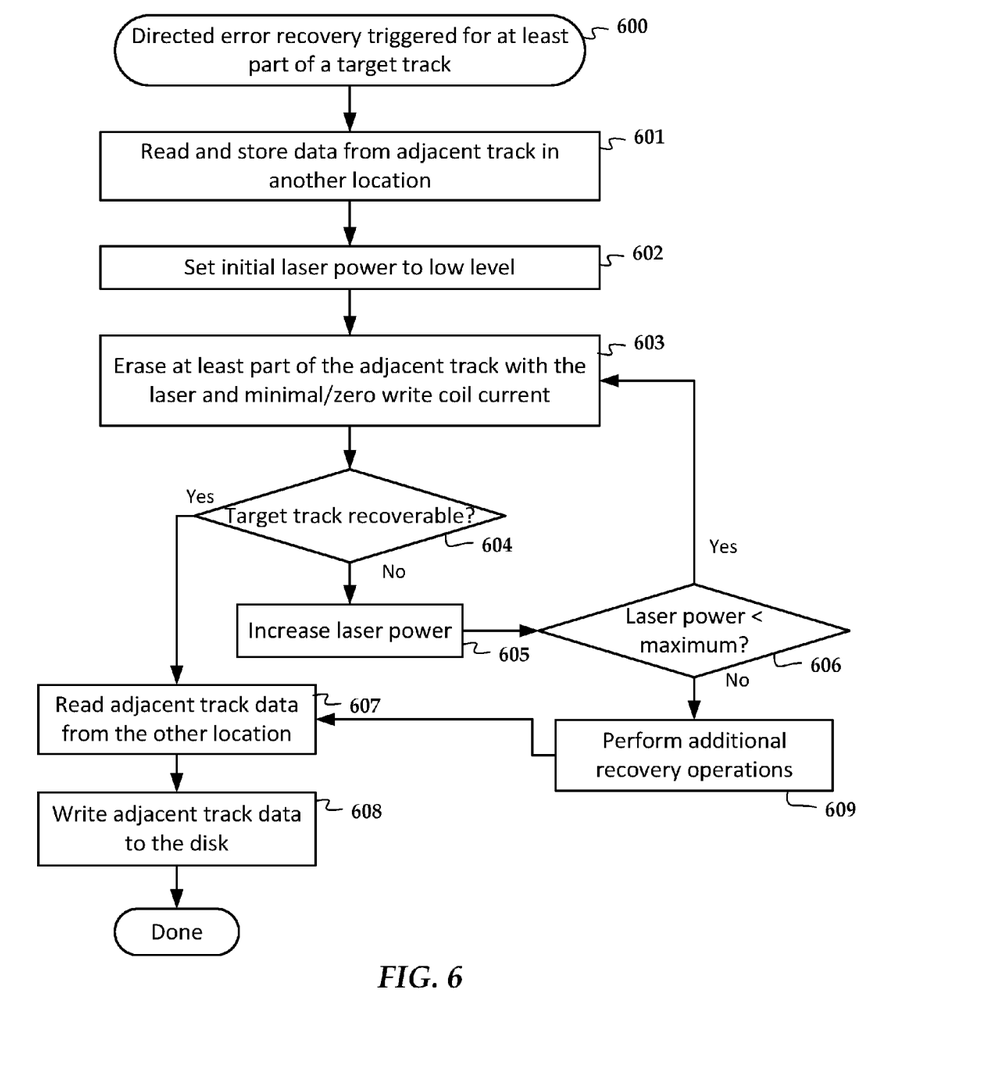

In FIG. 6, a flowchart shows an error recovery procedure according to another example embodiment. The procedure is triggered in response to directed error recovery 600 due to an error encountered when reading a target track. Data from at least part of an adjacent track is read and stored 601 to another data storage location, e.g., in a volatile or non-volatile memory buffer. Data from just one or both adjacent tracks on either side of the target track may be read and stored 601.

After data from the adjacent track is stored 601, an initial, low value of the laser power is set 602. This power level may be lower than is typically used, but should be sufficient to heat at least some of the recording medium to the Curie temperature or above. At this laser power level, the adjacent track is erased 603 with zero or minimal write current. After the erasure 603, it is determined 604 (e.g., by re-reading the track) whether data in the track is recoverable.

If the target track data is not recoverable as determined at block 604, then the laser power is increased 605, e.g., by incrementing a value sent to a digital-to-analog converter (ADC) that drives the laser. If this value does not exceed some value as determined at block 606, then blocks 603-605 are repeated until either the track is recoverable as determined at block 604, or the maximum laser power is reached as determined at block 606. This sweeping of laser power to erase 603 the adjacent track may be able to provide an optimal balance between adjacent track interference reduction of the target track and encroachment/erasure of the target track when erasing the adjacent track.

If the data from the target tracks has been recovered as determined at block 604, then adjacent track data is read 607 from the other data storage location and the data is written 608 back to the disk. As with the procedure shown in FIG. 5, the writing 608 may involve rewriting the buffered data back to its previous location or elsewhere. In the latter case, the functionality of blocks 607 and 608 may already have been performed at block 601 in cases where the other location is on the disk and the adjacent track data is to be moved to that location and not just buffered there. Also as described in regards to FIG. 5, if the writing 608 involves rewriting the adjacent track data to the previous location, then the target track part may be subsequently verified, and all or part of the target track may be moved if errors are found during this verification.

If the laser power has reached a maximum as determined at block 606, then additional error recovery operations 609 may be performed. Similar to the procedure shown in FIG. 5, this may involve erasing another adjacent track if only one track was originally erased 603, repeating the erasure 603 with different (e.g., non-zero, steadily increasing) write coil current settings, or communicating with the host if the target data cannot be recovered. Whether or not the addition operations 609 are successful, the adjacent track data will be subsequently restored as indicated by blocks 607 and 608 so that no additional data is lost. In scenarios where the target track data is recovered, the affected portion of the target track may remain as is, the affected portion of the target track may be refreshed, or the data from the affected portion may be moved elsewhere on the disk.

The erasure of one or more adjacent tracks with minimal/zero write current may have advantages in some situations. For example, writing a single tone test pattern (e.g., 1T pattern) during error recovery may involve switching write modes (e.g., wedge mode) in the channel, which can complicate the procedure. Further, writing 1T pattern causes greater heating in the head than writing other patterns (e.g., random), thereby inducing a protrusion of the write transducer towards the disk. Because the HAMR media is rougher than conventional media, the excess protrusion from writing a single tone could result in head-to-media contact, reducing life of the read/write head.

In current error recovery procedures, there is an adjacent track interference cancellation (ATIC) operation that involves reading adjacent track data, and constructing a waveform that represents the assumed interference at the head when reading the target track. That waveform is used to remove interference from target track signal. The remaining signal is then passed on to the read data path for decoding. If successfully decoded, the target track may be left as-is or other remedial operations may occur, such as refreshing the target track or moving the target track data elsewhere.

Compared to ATIC, adjacent track erasure is easier to implement in software as it does not require additional signal processing algorithms. Also, ATIC may not remove the local adjacent track interference effect, such as neighbor-induced bias shift, due to local low frequency pattern. Nonetheless, because erasing and re-writing of the adjacent track data can be time consuming, both ATIC and adjacent track erasure can be implemented. For example, ATIC may be performed first to reduce adjacent track interference in the target track signal. If ATIC is unsuccessful in decoding the target data, the adjacent tracks can be erased. Note that because ATIC involves reading the adjacent track anyway, the ATIC may store the adjacent track data for use in subsequent operations. For example, blocks 501-502 in FIG. 5 and/or block 601 in FIG. 6 may be performed by an ATIC operation that occurs before the erasure of the adjacent track.

Figure 7:
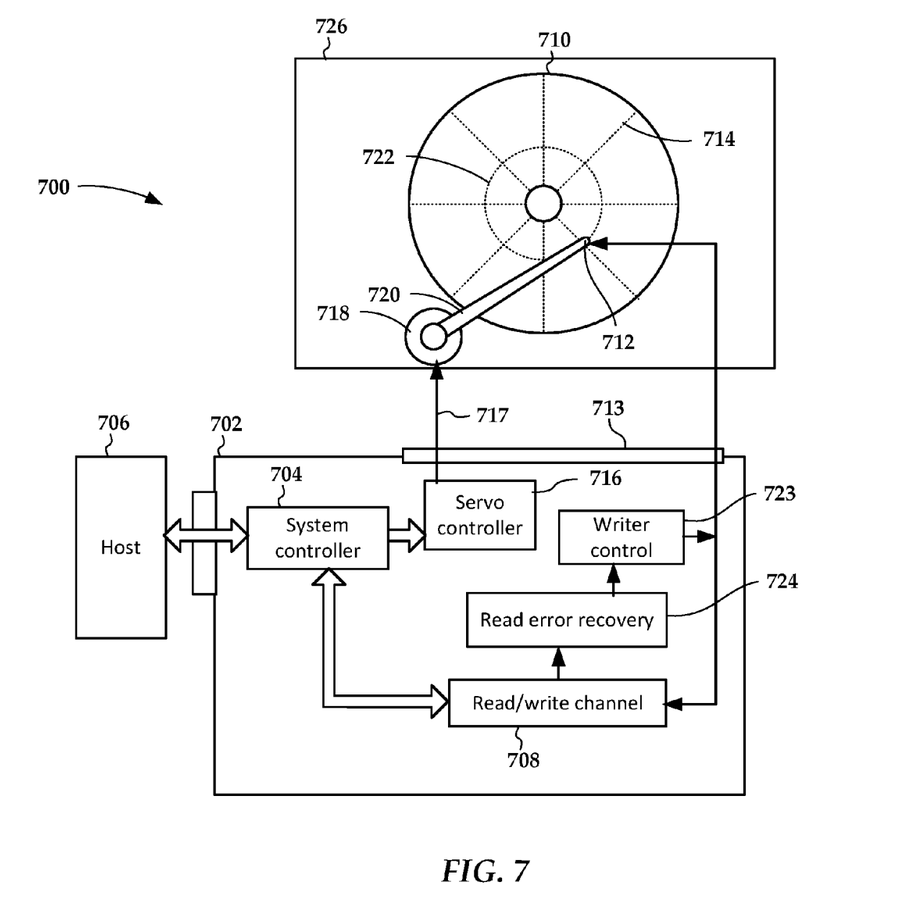
FIG. 7 is a block diagram of an apparatus according to an example embodiment.

In FIG. 7, a block diagram illustrates an apparatus 700 according to an example embodiment. Control logic circuit 702 of the apparatus 700 includes a system controller 704 that processes read and write commands and associated data from a host device 706. The host device 706 may include any electronic device that can be communicatively coupled to store and retrieve data from a data storage device, e.g., a computer, peripheral card, etc. The system controller 704 is coupled to a read/write channel 708 that reads from and writes to a surface of a magnetic disk 710.

The read/write channel 708 generally converts data between the digital signals processed by the system controller 704 and the analog signals conducted through one or more read/write heads 712 during read operations. The read/write channel 708 may also send control signals to the read/write head 712 and receive sensor signals from the read/write heads 712. To facilitate the read operations, the read/write channel 708 may be coupled to the read/write heads 712 via analog and/or digital interface circuitry 713. The read/write channel 708 also provides servo data read from servo wedges 714 on the magnetic disk 710 to a servo controller 716. The servo controller 716 uses these signals to provide a voice coil motor control signal 717 to a VCM 718. The VCM 718 rotates an arm 720 upon which the read/write heads 712 are mounted in response to the voice coil motor control signal 717.

The apparatus 700 uses HAMR, and therefore the read/write heads 712 include an energy source (e.g., laser diode) that heats the magnetic disk 710 when recording. A writer control module 723 (e.g., via read/write channel 708) sends a current to activate the lasers together with a magnetic writer current (e.g., write coil current) when recording. This records tracks of data onto the disk 710, the data later being read back by the read/write head 712. In some instances, read/write channel 708 is unable to recover stored data from at least part of a track. This results in a directed error recovery being performed by a read error recovery module 724.

As part of the directed error recovery, the read error recovery module 724 in one embodiment causes the read/write head 712 to read data from at least part of an adjacent track that is immediately proximate the target track, the data being stored to another data storage location, e.g., the disk 710 or solid-state memory that is coupled to logic circuit 702. For two or more iterations in which a laser power is incrementally changed from a lower power to a higher power, the read error recovery module 724 causes the read/write head 712 to erase at least part of the adjacent track at the laser power and attempt to recover the target track.

In another embodiment, the directed error recovery for the target track involves the read error recovery module 724 causes the read/write head 712 to read data from at least part of an adjacent track that is immediately proximate the target track, the data being stored to another data storage location. The read error recovery module 724 causes the read/write head 712 (e.g., via writer control 723) to erase at least part of the adjacent track using a laser of a read/write head 712. During the erasure, a write coil of the read/write head 712 has zero current applied such that the erasure is only due to heating from the laser The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. In other embodiments, custom logic circuits may be constructed/configured to provide this functionality. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
   determining an error in a target track of a heat-assisted recording medium that triggers an error recovery procedure, the error recovery procedure comprising:
      storing data from at least part of an adjacent track that is immediately proximate the target track to another data storage location;
      storing second data from at least part of a second adjacent track on another side of the target track; and
      for two or more iterations in which a laser power is incrementally changed from a lower power to a higher power, erasing at least part of the adjacent track and at least part of the second adjacent track at the laser power and attempt to recover the target track.

2. The method of claim 1, wherein if the target track is recovered, rewrite the data from the storage location back to the adjacent track.

3. The method of claim 1, wherein if the target track is recovered, rewrite the data from the storage location to a location on the heat-assisted recording medium different from the adjacent track.

4. The method of claim 1, wherein a magnetic writer has zero current applied for the two or more erasures such that the erasure is only due to heating from a laser to which the laser power is applied.

5. The method of claim 4, wherein if the target track is not recovered, the error recovery procedure further involves performing additional iterations, a non-zero current being applied to the magnetic writer during the additional iterations.

6. The method of claim 5, wherein the laser power is at a constant value for the additional iterations.

7. The method of claim 1, wherein a magnetic writer has a minimal current applied for the two or more erasures such that write-plus-erase width using the minimal current does not increase relative to a laser-only write-plus-erase width.

8. The method of claim 1, wherein the error recovery procedure further comprises constructing, based on the data from the adjacent track, a waveform that represents an assumed interference when reading the target track, the waveform being used to remove the assumed interference from a signal of target track, and wherein the erasing of the at least part of the adjacent track for the two or more iterations occurs if the signal cannot be decoded with the assumed interference removed.

9. A method, comprising:
   determining an error in a target track of a heat-assisted recording medium that triggers an error recovery procedure, the error recovery procedure comprising:
      storing data from at least part of an adjacent track that is immediately proximate the target track to another data storage location;

erasing at least part of the adjacent track using a laser of a read/write head, wherein a write coil of the read/write head has zero current applied during the erasing such that the erasing is only due to heating from the laser; and attempting to recover the target track subsequent to the erasing.

10. The method of claim 9, wherein if the target track is recovered, rewrite the data from the storage location back to the adjacent track.

11. The method of claim 9, wherein if the target track is recovered, rewrite the data from the storage location to a location on the heat-assisted recording medium different from the adjacent track.

12. The method of claim 9, wherein the error recovery procedure further comprises:

storing second data from at least part of a second adjacent track on another side of the target track; and erasing at least part of the second adjacent track using the laser and zero current applied to the write coil before attempting to recover the target track.

13. The method of claim 9, wherein a laser power applied to the laser is incremented for two or more iterations, the two or more iterations comprising repeatedly performing the erasing of the at least part of the adjacent track and the attempting to recover the target track.

14. The method of claim 9, wherein the error recovery procedure further comprises constructing, based on the data from the adjacent track, a waveform that represents an assumed interference when reading the target track, the waveform being used to remove the assumed interference from a signal of target track, and wherein the erasing of the at least part of the adjacent track occurs if the signal cannot be decoded with the assumed interference removed.

15. The method of claim 9, wherein if the target track is not recovered, the error recovery procedure further involves performing additional iterations, a non-zero current being applied to the magnetic writer during the additional iterations.

16. An apparatus comprising:

interface circuitry configured to communication with a read/write head, the read/write head comprising a laser and a write coil used to record to a heat-assisted recording medium; and a controller coupled to the interface circuitry and configured to, via the read/write head:

determine an error in a target track of the heat-assisted recording medium that triggers an error recovery procedure, the error recovery procedure causing the controller to:

store data from at least part of an adjacent track that is immediately proximate the target track to another data storage location;

erase at least part of the adjacent track using the laser, wherein the write coil has zero current applied during the erasure such that the erasure is only due to heating from the laser; and attempt to recover the target track subsequent to the erasure.

17. The apparatus of claim 16, wherein the error recovery procedure further causes the controller to, via the read/write head:

store second data from at least part of a second adjacent track on another side of the target track; and erase at least part of the second adjacent track using the laser and zero current applied to the write coil before attempting to recover the target track.

18. The apparatus of claim 16, wherein a laser power applied to the laser is incremented for two or more iterations, the two or more iterations comprising repeatedly performing the erasing of the at least part of the adjacent track and the attempting to recover the target track.

19. The apparatus of claim 16, wherein the error recovery procedure further comprises constructing, based on the data from the adjacent track, a waveform that represents an assumed interference when reading the target track, the waveform being used to remove the assumed interference from a signal of target track, and wherein the erasing of the at least part of the adjacent track occurs if the signal cannot be decoded with the assumed interference removed.

* * * * *